UNITED STATES PATENT OFFICE.

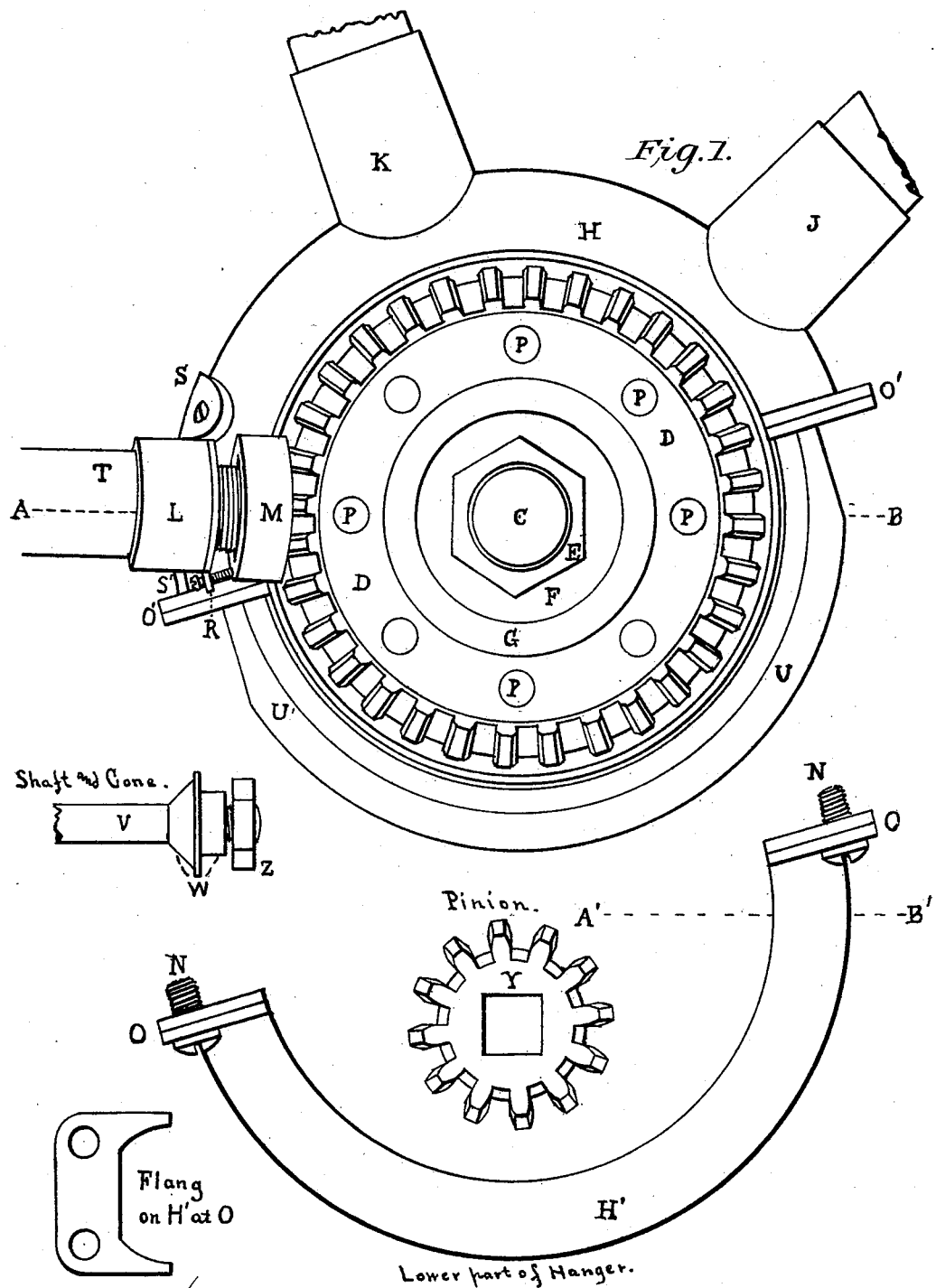

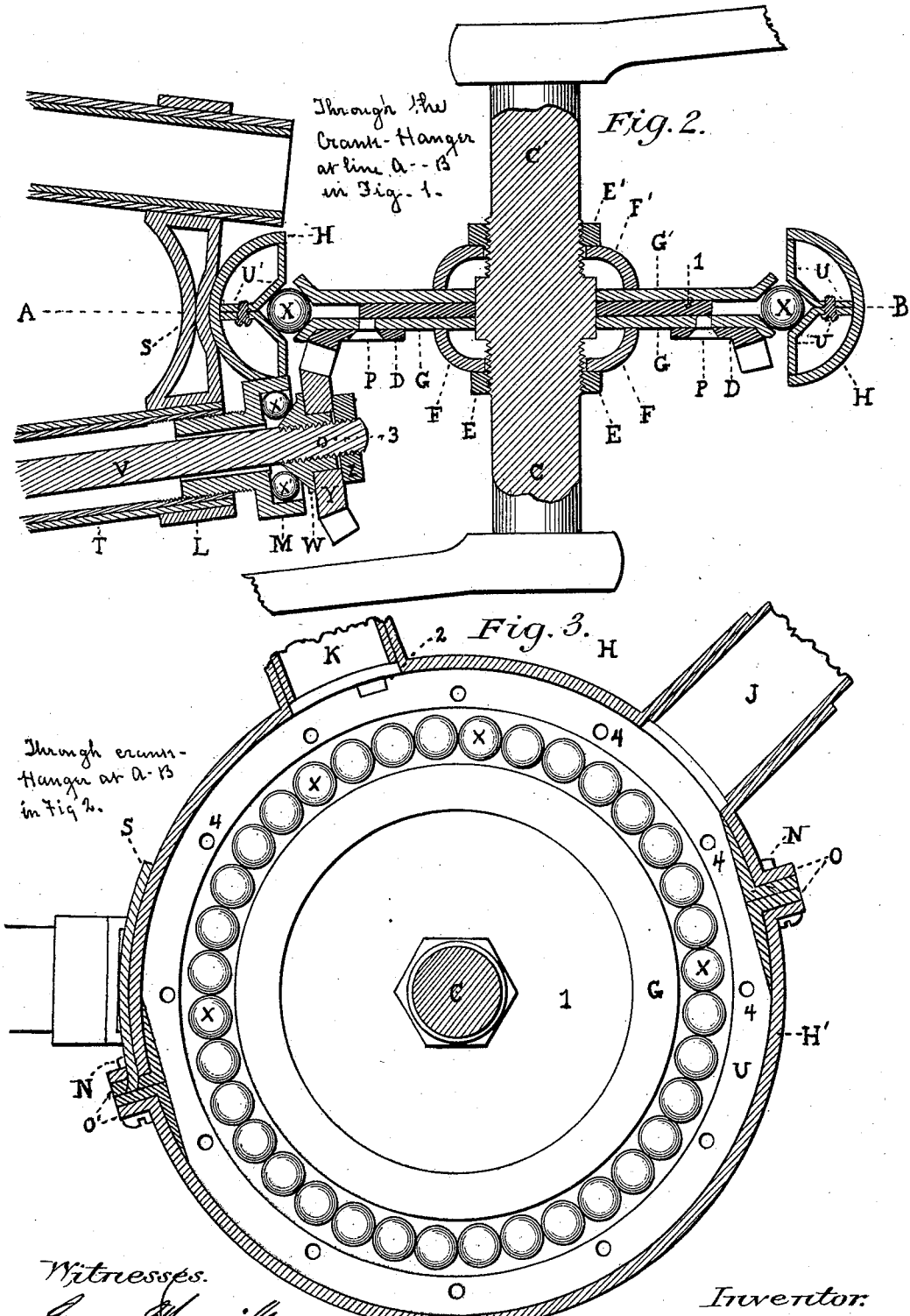

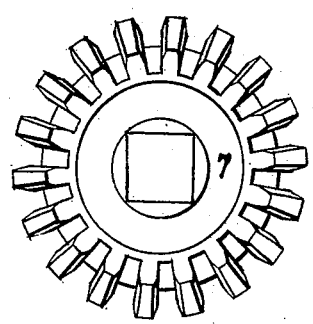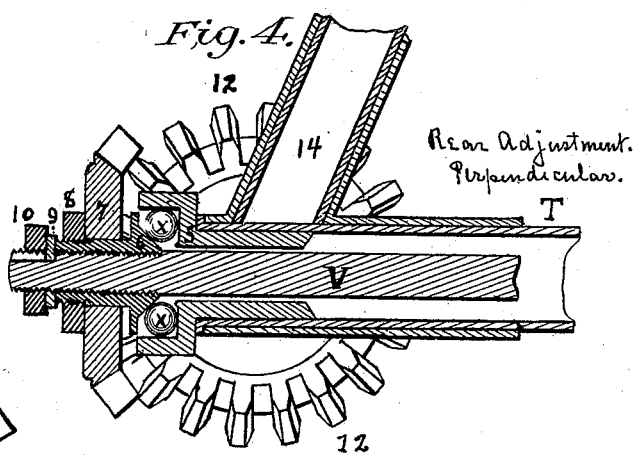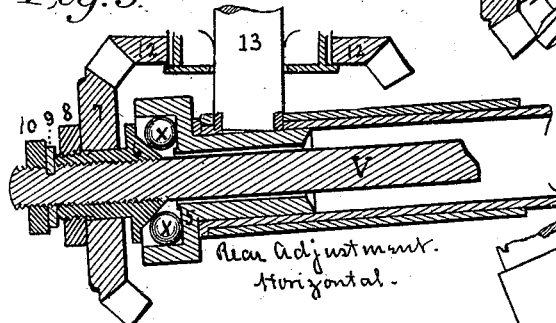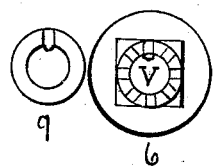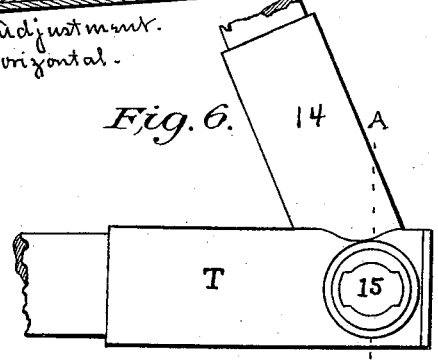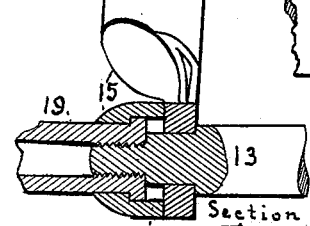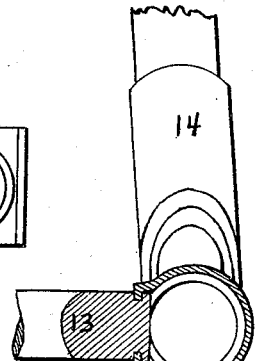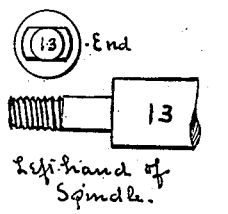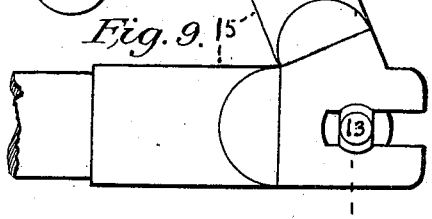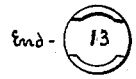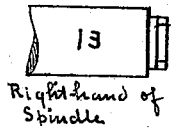

CHARLES WILL HAMILTON, OF OMAHA, NEBRASKA.

CHAINLESS GEARING FOR BICYCLES.

SPECIFICATION forming part of Letters Patent No. 618,870, dated February 7, 1899.

Application filed April 21, 1898. Serial No. 678,414. (No model.)

*To all whom it may concern:*

Be it known that I, CHARLES WILL HAMILTON, of Omaha, in the county of Douglas and State of Nebraska, have invented a new and useful Improvement in Gearing for Bicycles, which improvement is fully set forth in the following specification, reference being had to the accompanying drawings.

The object of my invention is to provide a means of transmitting power from the pedals to the drive-wheel of a bicycle for the purpose of propelling the same and to replace the sprocket wheels and chain now in use. The bicycle to which it is to be attached does not materially differ from those now in common use propelled by pedals, a chain, and sprocket-wheels, except as hereinafter described.

In the accompanying drawings, forming a part of this specification and on which similar letters and numerals of reference indicate the same or corresponding features, Figure 1 is a plan view of my improved gear with several of the minor parts shown in detail. Fig. 2 is a longitudinal sectional view showing the main gear with its intermeshing pinions and shaft. Fig. 3 is a detail view showing the ball-bearings. Fig. 4 is a detail view, partly in section, of the rear pinion and shaft. Fig. 5 is a detail view in section, showing the particular construction of the intermediate shaft and its bearings. Figs. 6 and 7 are detail views showing the connection between the rear horizontal and rear vertical tubes of the frame, and Figs. 8 and 9 are further detail views of the same.

The crank-hanger instead of being of the usual or ordinary type is larger in diameter and is made of two semicircular U-shaped pieces of steel of the size and shape shown in Fig. 1, at H H'. To the upper half H is attached the rear fork by means of the rings L, formed integral with the plates S S', the latter being screwed to a bracket, the saddle-post K, and the front tube J. The lower half H' serves to keep the pedal crank-gear and its ball-bearings in place and at the same time to strengthen the hanger. This hanger carries the right and left cone-circles U U', Figs. 1 and 2, which are held together by screws 4, Fig. 3, and kept from turning in the hanger by means of the square braces of the flanges O O' and the lug 2, Fig. 3. In the groove formed between the cone-circles the balls $x$ $x$, Figs. 2 and 3, of the ball-bearings of the crank-gear roll. The cone-plate wheels G G' of the crank-gear revolve on these balls. Attached to the right-hand cone-plate G, by means of bolts P P, is the cog-collar D. The bore or hole through the center of the cone-plate wheels G G' is hexagonal and fits onto a hexagonal enlargement on the crank-shaft, as shown at C, Fig. 3. The cone-plate wheels are kept apart by a circular mat 1, Fig. 2, made of rubber, leather, or other suitable material, and are brought to bear against the balls in the cone-circles by means of the cup-washers F F', Fig. 2, and nuts E E', Fig. 2, that screw onto the crank-shaft C, Fig. 2, on either side, as shown.

Through the right-hand tube T of the rear fork passes the power-shaft V, Fig. 2, of the gear. This shaft is suspended by means of ball-bearings in ball-bearing cups, as hereinafter described, at both ends of the tube. The front ball-bearing cup M, Figs. 1 and 2, screws into the end of the right-hand tube T of the rear fork.

Screwed onto the end of the shaft V, Fig. 2, is the cone-bearing W, which is held in place by a pin 3, Fig. 2, passing through the shank of the cone and an eye in the shaft. This cone-bearing has a square shank, on which the pinion Y, Fig. 2, is fitted and held in place by a nut Z, Fig. 2.

The cogs of the pinion Y are brought into communication with the cogs of the crank-gear by screwing the ball-cup M forward, and when the adjustment has been made the cup is locked in place by means of the small screw R, Fig. 1, the end of which fits into notches around the edge of the ball-bearing cup.

When the pedals attached to the crank-shaft are worked, the crank-gear revolves and the cogs working in those of the pinion Y turn it and communicate the motion to the shaft V, by means of which the motion is transmitted to the rear gear-wheel 7, Fig. 4, at the other end of the tube T, Fig. 4. The cogs of the gear-wheel 7 work into the cogs of the conical wheel 12, Fig. 4, rigidly attached to the hub of the rear wheel of the bicycle, and thus the motion is communicated to the rear wheel of the bicycle, which turns on the spindle 13, Fig. 5.

The rear ball-bearing cup 5, Fig. 4, is brazed into the rear end of the tube T and holds the balls $x'$ $x'$ of the ball-bearings on which the rear cone 6, Fig. 5, of the shaft V bears. By means of this cone and the one on the front end W, Fig. 2, the shaft is held in its place. The cone 6, Fig. 4, can be screwed forward or backward to adjust the length of the shaft, and when the adjustments are made it is held in place by the nut 10 and washer 9, which has a projection that fits into a groove in the shaft and also one that fits into grooves in the cone, as shown in the drawings. The cog-wheel 7 is held in place on the square shank of the cone 6 by the nut 8.

In Fig. 6 the mode of attachment of the spindle to the rear fork is shown. An opening is made in the end of the fork, the horizontal diameter of which said opening is greater than its vertical diameter, and the end of the spindle is made of corresponding configuration. On the spindle and a short distance from its outer end is a notch which permits of the rotation of the spindle within the opening 15. The left-hand adjustment is shown more particularly in Fig. 9. The fork is shown in this latter figure as provided with a slot instead of the opening above described. This spindle, as shown in Fig. 9, is provided with a flattened end, which is notched, and thus made capable of rotation within the slot. In setting up the machine the right-hand end of the spindle is inserted into the opening 15, the left-hand end being slipped into the slot numbered 20 (see Fig. 9) and given a quarter-turn, thus locking the right-hand end in the opening 15. The washer 18, consisting of the annular plate 16 and the two lugs 17, is then slipped over the end of the spindle 13, and the lugs registering with the slot on either side of the spindle thus prevent its rotation. The nut 19 is then screwed on, clamping the parts together in proper position.

Having thus fully described my invention, what I claim as new, and desire to secure by Letters Patent, is—

1. In a bicycle, the combination with the frame thereof, an intermediate shaft provided with a cog-wheel, and a main driving-shaft having cone-plates of comparatively large diameter centrally mounted upon it forming the entire shaft-bearing, each plate having a flaring periphery and so bolted to each other that the flaring peripheries form an annular groove and one of which cone-plates is provided with a cog-collar to intermesh with the cog-wheel on the intermediate shaft, of a hollow bracket consisting of semicircular sections, to the upper of which are attached the converging frame-tubes and within which sections the main driving-shaft and cone-plates are located, and an annular recess within said bracket oppositely disposed to the annular groove formed by the cone-plates, the two forming a race for the balls.

2. In a bicycle, the combination with the frame thereof, an intermediate shaft provided with a cog-wheel, and a main driving-shaft having cone-plates of comparatively large diameter centrally mounted upon it forming the entire shaft-bearing, each plate having a flaring periphery and so bolted to each other that the flaring peripheries form an annular groove, and one of which cone-plates is provided with a cog-collar to intermesh with the cog-wheel on the intermediate shaft, and a mat located between the cone-plates and suitable means for securing the cone-plates and mat firmly together, of a hollow bracket consisting of semicircular sections to the upper one of which are attached the converging frame-tubes and within which sections the main driving-shaft and cone-plates are located, and an annular recess within said bracket oppositely disposed to the annular groove formed by the cone-plates, the two forming a race for the balls.

C. WILL HAMILTON.

Witnesses:
FRANK HAMILTON,
FRED P. HAMILTON.